Patented June 26, 1945

2,379,237

UNITED STATES PATENT OFFICE 2,379,237

PIGMENTATION OF FINELY DIVIDED PLASTICS

John D. Jenkins, Forest Hills, Pa., assignor to Pittsburgh Plate Glass Company, Allegheny County, Pa., a corporation of Pennsylvania No Drawing. Application October 30, 1940, Serial No. 363,498

1 Claim. (Cl. 260—37)

The present invention relates to the pigmentation of plastic compositions and it has particular relation to the pigmentation of such compositions when they are in very finely-divided form.

One object of the invention is to provide a pigmented composition of finely-divided plastic material which can readily be formed into films of high uniformity and excellent gloss.

This and other objects of the invention will be apparent from consideration of the following specification and the appended claims.

It has heretofore been proposed to provide plastic materials in very finely-divided form suitable for suspension in non-solvent vehicles to form compositions which can be applied as coatings to surfaces in place of the conventional solutions of plastics in organic solvents. One method of forming finely-divided powders or pulverulent masses suitable for use in such process includes projecting a fine spray of a solution of plastic into a precipitating medium. A second method involves emulsifying solutions of plastic in a nonsolvent. However, a more satisfactory method appears to involve addition of a non-solvent medium or precipitating agent to a solution of plastic to the point of incipient gelation, then subsequently cooling and agitating the solution, in order to break it up into fine particles and finally washing away the solvent with non-solvent medium.

The present invention contemplates the addition of a pigmentary body to a solution of plastic, followed by the conversion of the latter into a finely-divided solid. Methods of preparation of finely-divided plastics from their solutions suitable for use in the present process are disclosed in British Patent 498,396, British Patent 481,532 and German Patent 670,212. If one of these methods is resorted to, a suitable proportion of pigment such as titanium dioxide, lead chromate, Prussian blue, iron oxide, china clay, lithopone, zinc sulfide, pyro red or other pigmentary material is added to any of the solutions disclosed in the patents and conversion of the plastic to finely-divided solid state is effected. The amount of pigment, of course, will depend upon the nature of the pigment itself, and the intensity of color or degree of hiding power desired in the finished product, for example, it varies within a range of 2 to 500%, based upon the plastic content. Each particle of plastic will carry its own charge of pigment.

The preferred method of forming finely-divided plastic involves adding a precipitant to a solution of plastic approximately to the point of incipient gelation, then cooling and agitating to form a finely-divided precipitate. Finally the solvent is washed out to leave the plastic in such condition that it retains its finely-divided condition even at room temperatures. The following are specific examples illustrating such method:

Example 1

About 150 parts of the resin obtained by partial condensation of polyvinyl alcohol with butyraldehyde was dissolved in 850 parts of synthetic methanol, and 750 parts of the pigments herein described were added. To this suspension under agitation at room temperature was added 90 parts of water. The resin was partially precipitated during this addition but redissolved upon continued agitation to form a clear fluid solution. The charge was continuously agitated and was gradually cooled. At 18° C. the charge became pigmented and started gelling and at 5° C. the gel was quite heavy and viscous. Very strong agitation was required to keep the solution homogeneous at this point. At $-3°$ C. some syneresis occurred and at $-10°$ C. the gel began breaking and precipitation started. At $-20°$ C. the resin had precipitated and the product was in fluid suspension. It was further cooled to $-30°$ C. and an additional 2000 parts of water was added at this point to harden the resin. The mixture was poured into 3000 parts of water at room temperature and the product was isolated by filtration. It was dried in a current of air at 25° C. to yield a very light fluffy powder, 94.7% of which readily passed a 200 mesh sieve. Under the microscope the particle size appeared to be very uniform and in the neighborhood of 1000 mesh.

The filtered resin may be dried at any temperature below its softening point without serious coalescence of the resultant powder. A temperature of 45–50° C. has been found generally most satisfactory for polyvinyl acetal resins. The powder could be suspended in any convenient non-solvent liquid medium and used for coating purposes. Examples of such media are water and petroleum spirits.

Example 2

A solution was prepared by dissolving under agitation at room temperature, 100 parts of the resin obtained by copolymerizing, 87 parts of vinyl chloride and 13 parts of vinyl acetate in 900 parts of acetone and a pigment such as titanium dioxide was added. To this suspension under agitation were added 320 parts of 88% isopropanol. Particles of resin precipitated during this addition but redissolved readily upon continued agitation. There resulted a slightly hazy but very fluid solution which was gradually cooled. At 5° C. the solution had become pigmented and quite viscous. At $-4°$ C. the resin precipitated in very finely-divided form to yield a fluid suspension. Cooling to $-40°$ C. brought no further change in the appearance of the suspension.

An additional 700 parts of 88% isopropanol were added at $-40°$ C. and immediately thereafter 1500 parts of water raising the temperature to $-24°$ C. The charge was then dropped into 7000 parts of water at room temperature, filtered and dried to give a fluffy powder of a particle size of about .5 to 100 microns.

Example 3

Fifty parts of a commercial polymerized methacrylic resin known as "Acryloid BC-27" were dissolved in 450 parts of acetone and a desired amount of a pigment such as titanium dioxide was added. To this suspension under agitation at room temperature were added 75 parts of water. The resulting solution was gradually cooled. At 9° C. it was viscous. At 2° C. it was very viscous and required strong agitation to keep the mixture homogeneous. Between 0 and —5° C. the viscosity decreased very rapidly indicating that the gel had broken and the resin precipitated. At —8° C. an additional 500 parts of water were added after which the charge was dropped into 6000 parts of water at room temperature.

After mixing 1 hour the resin was filtered and was subsequently dried. It was then obtained as a fine, pigment charged powder the major portion of which readily passed a 200 mesh sieve.

Example 4

A sample of polyvinyl alcohol was prepared by the hydrolysis of low viscosity polyvinyl acetate by the method described by Blaikie and Crozier, J. Ind. and Eng. Chem. 28 1158 (1936). According to this method fifty parts of the polyvinyl acetate known commercially as "Vinylite AYAA" were dissolved in 100 parts of synthetic methanol. A solution of 0.25 part of caustic potash in 10 parts of methanol was added. After several hours, the solution had set to a gel and after 18 hours a rubbery gel remained covered by a clear mixture of methyl acetate and methanol. The solvent was decanted and the gel was dissolved in water. The resulting solution was held at 90-100° C. until the residual methanol and methyl acetate had been distilled. Additional water was then added so that the final concentration corresponded to the addition of 330 parts of water. Fifty parts of pigment, such as titanium dioxide or lead chromate or china clay were added.

To this suspension under agitation was added 330 parts of acetone by volume. It was then chilled gradually to —10° C. where it gelled. At —20°, the gel started synerizing and at —25° the gel was definitely broken and the product had precipitated. At —25 to —30° C. 1000 parts of acetone were added and the resulting suspension was allowed to warm to room temperature and was filtered. The filter cake was washed with 1000 parts of fresh acetone and was then dried in an oven at 65° C. to form a powder the particles of which were charged with pigment.

Example 5

Forty parts of a commercial resin obtained by polymerizing ethyl methacrylate were dissolved in a mixture consisting of 316 parts of 99.5% alcohol and 60 parts of acetone by volume and the pigment was added. The suspension was agitated at room temperature and there was added a solution consisting of 40 parts of water in 100 parts of alcohol. No precipitation occurred. It was then gradually cooled until at 12° C. it began to gel. At 10° C. the gel started to break and at 5° C. the gel had broken and there was a very fluid suspension. The charge was cooled to —15° C. and was there diluted with 140 parts of water. It was then poured into 2500 parts of water to form a fine suspension.

The suspension was filtered and the cake was washed with water. It was then dried in an oven at 50° C. to obtain a product of about .5 to 100 microns particle size.

Example 6

Eighty parts of the vinyl chloride-vinyl acetate copolymer known commercially as "Vinylite VYLF" was thoroughly mixed with 120 parts of isopropanol. The resulting mass was dissolved in 200 parts of acetone to form a fluid solution to which lead chromate or other pigment could be added in amount up to 500%, based on plastic content. The solution was gradually cooled to —35° C. at which temperature a slight gelling action was observed. Then under strong efficient agitation there was slowly added 40 parts of isopropanol. This was followed by 40 parts of 90% isopropanol, the addition of which resulted in completing the precipitation.

The resulting suspension was rapidly diluted with 2400 parts of water and the finely-divided pigmented resin was filtered and washed with additional amounts of water.

Example 7

A solution was prepared by dissolving 80 parts of polymerized methyl methacrylate in 633 parts of acetone. The resin dissolved very slowly but yielded a clear homogeneous solution to which pigments such as Prussian blue or the like could be added. There was then added at room temperature 214 parts of 50% (by volume) aqueous ethyl alcohol.

The solution was then gradually cooled under continuous strong agitation. At 18° C. there was considerable gelling and some syneresis had occurred. At 13° C., the heavy gel started breaking and the solution started becoming thinner. At 6° C. it was quite fluid. It was rapidly cooled from this point to —15° C. and 270 parts of water were added at —15° C. to 10° C. The cold suspension was rapidly poured into an additional 4300 parts of water under agitation at room temperature.

After filtering and drying at 105° F., the resin was obtained in finely-divided but pigmented state.

Example 8

An intimate mixture of 5 parts of vinyl chloride-vinyl acetate copolymer known commercially as "Vinylite VYHH" and 7.5 parts of titanium dioxide pigment was prepared by thorough mixing on a differential 2 roll mill. This mixture was introduced into 90 parts of acetone under agitation in a jacketed mixer. As soon as the suspension became homogeneous, there was added an additional 17.5 parts of "Vinylite VYHH."

The resin dissolved to form a rather viscous solution in which the pigment was homogeneously suspended. There was then added slowly and under good agitation 29.25 parts of 91% aqueous isopropanol.

The still fluid suspension was gradually cooled under strong agitation until at about 5°-0° C. During this time the suspension gradually thickened as the gel formed and then thinned as precipitation of the resin occurred. An additional 58.5 parts of 91% aqueous isopropanol were added and the cold suspension was then rapidly diluted in 650 parts of water.

After filtering and drying at 100° F. the resin-pigment mixture was obtained as a soft powder readily passing a 200 mesh sieve.

Example 9

One hundred forty parts of the resin obtained by condensing polyvinyl alcohol with butyraldehyde was dissolved to a clear solution in 1860 parts of methanol and pigment in appropriate amount was added. The solution was cooled to −15° C. and water was added slowly under strong agitation. When 11 parts of water had been added, heavy gel was formed and after 12 parts, the gel began to break and shortly thereafter a very finely precipitated powder was formed. A total of 2600 parts of water was added at the low temperature, after which the suspension was poured into 18,000 parts of water at room temperature. The resin was filtered and was dried at 36° C. It was thus obtained as a fine powder, at least 97% of which readily passed a 100-mesh screen.

In event that it is desired to prepare plasticized and pigmented pulverulent or dispersed bodies of plastic materials, the method disclosed in my copending application Serial No. 298,959, filed October 11, 1939, and entitled Plasticization of plastics, may be employed. This method broadly embodies the admixture of the pigmented plastic material in finely-divided, solid form with a liquid which has no, or at least but slight, solvent power for the plastic, but is a solvent for the plasticizer which is to be added. Pigmentary material to be incorporated with the plastic is added to the solution prior to the precipitation of the plastic in finely-divided form.

The pigmented suspensions of solid plastics either plasticized or unplasticized may be filtered in order to remove the vehicle and any residual medium clinging thereto may be removed by evaporation. Of course, if desired, the suspending medium may be retained to provide compositions which may be employed for coating purposes or as printing inks and such like uses. After the suspensions have been applied to the surface designed to receive them the suspending medium is eliminated by evaporation or by absorption to the surface upon which they are superposed, or by a combination of the two methods. The coated bodies may then be subjected to heat, for example, in ovens or by hot calendering or the like, in order to insure complete evaporation of liquids and to soften or fuse, and thus effect coalescence of the particles of plastic and also to promote adhesion to the supporting surfaces.

The following represent typical examples of coating composition suitable for application to various surfaces and including finely-divided plastic in the particles of which are incorporated pigmentary materials:

Example A

|  | Percent |
|---|---|
| Partial poly-vinyl butyral | 14 |
| Dibutyl phthalate | 6 |
| Titanium dioxide pigment | 20 |
| Petroleum spirits | 60 |
|  | 100 |

Example B

|  | Percent |
|---|---|
| Partial polyvinyl butyral or acetal | 14 |
| Dibutyl phthalate | 6 |
| Carbon black | 3 |
| Petroleum spirits | 77 |

In the foregoing examples the pigment, of course, was suspended in the finely-divided plastic.

In one example titanium dioxide was dispersed in so-called vinylite H powdered by the foregoing methods and was then dispersed in mineral spirits and pasticized with triethylene dihexoate and applied to a steel panel and baked at 300° F. for 15 minutes. The resultant finish had excellent gloss as well as good adhesion and hardness.

Resins soluble in the dispersing agent for the finely-divided pigmented plastic may also be incorporated into the suspensions. These resins improve dispersion and improve adhesion to the body to be coated. The following is an example of such system:

Example C

|  | Parts |
|---|---|
| Finely-divided Vinylite H constituting the copolymer of vinyl chloride and vinyl acetate containing 70% titanium dioxide | 40 |
| Un-pigmented Vinylite H constituting the copolymer of vinyl chloride and vinyl acetate powder | 15 |
| Diamyl phthalate | 6 |
| Turpine-maleic anh. resin ("Petrex 4") | 5 |
| Mineral spirits | 34 |

Dispersing agents, such as aluminum naphthenate, zinc resinate, etc. may be added to any of the compositions in amounts for example of 1 or 2%, more or less.

Solvents may also be added in small amounts, e. g. 1% or other amount so long as it is insufficient to cause coalescence of the plastic particles in suspension. These solvents promote baking of the films into uniform state. In the case of powders of Vinylite H, such solvents as isophorone, methyl amyl ketone, benzyl alcohol, etc. may be added.

In coating compositions prepared as above described, dispersion of pigments is highly uniform, and there is no tendency for the pigment to become separated from the plastic during storage.

It is of course within the scope of the invention to provide pigmented powders of plastics in plasticized or unplasticized state and to consolidate them under heat and pressure into coherent masses. For example, they may be rolled out into sheets, or pressed in molds to form various articles. Preferably, the material during pressing should be heated to a temperature above the softening point.

The forms of the invention herein disclosed are to be considered merely as exemplary. It will be apparent to those skilled in the art that numerous modifications may be made therein without departure from the spirit of the invention or the scope of the claim.

What I claim is:

A method of forming fine, pigmented powders of organic plastics, which comprises suspending a pigment in a solution of organic plastic in a solvent for the plastic, adding to the solution a non-solvent liquid medium for the plastic until the point of incipient gelation is reached, then simultaneously agitating and cooling the system of liquid and plastic at least approximately to 0° C. until it first gels and then gel breaks and the liquid medium separated from the plastic by syneresis, forming a suspension of said finely-divided plastic with the pigment particles embedded in suspended plastic particles, then hardening the plastic by addition of more non-solvent and filtering off the finely-divided plastic.

JOHN D. JENKINS.